(12) United States Patent
Nguyen Manh et al.

(10) Patent No.: US 10,489,464 B2
(45) Date of Patent: Nov. 26, 2019

(54) AUTOMATIC INTEGRATION OF DATA RELATING TO A MAINTENANCE OPERATION

(71) Applicants: Airbus Operations (S.A.S.), Toulouse (FR); Airbus (S.A.S.), Blagnac (FR)

(72) Inventors: Dang Nguyen Manh, Toulouse (FR); David Marty, Colomiers (FR); Stéphane Sentenac, Blagnac (FR); Maria del Carmen Trigo Romero, Cornebarrieu (FR); Mathieu Dhainaut, Toulouse (FR); Jean-Claude Gallo, Toulouse (FR); Jean-Max Huet, Launaguet (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 873 days.

(21) Appl. No.: 14/880,756

(22) Filed: Oct. 12, 2015

(65) Prior Publication Data

US 2016/0103827 A1    Apr. 14, 2016

(30) Foreign Application Priority Data

Oct. 14, 2014   (FR) ...................................... 14 59857

(51) Int. Cl.
| | |
|---|---|
| *G06F 16/90* | (2019.01) |
| *G06F 16/25* | (2019.01) |
| *G06F 16/93* | (2019.01) |
| *G06F 17/27* | (2006.01) |
| *G06Q 10/00* | (2012.01) |

(52) U.S. Cl.
CPC ............ *G06F 16/93* (2019.01); *G06F 16/252* (2019.01); *G06F 17/2705* (2013.01); *G06Q 10/20* (2013.01)

(58) Field of Classification Search
None
See application file for complete search history.

(56) References Cited

U.S. PATENT DOCUMENTS

| | | | | |
|---|---|---|---|---|
| 2002/0195503 | A1* | 12/2002 | Allen, Jr. ............. | G06K 19/077 239/144 |
| 2005/0187721 | A1* | 8/2005 | Baust ..................... | G06Q 10/00 702/34 |

(Continued)

OTHER PUBLICATIONS

Douglas et al., Maintenance Performance Toolbox, Boeing, 2007 (Year: 2007).*

(Continued)

*Primary Examiner* — Usmaan Saeed
*Assistant Examiner* — Yu Zhao
(74) *Attorney, Agent, or Firm* — Jenkins, Wilson, Taylor & Hunt, P.A.

(57) ABSTRACT

Automation of the extraction and the consolidation of maintenance data and relates to a method and a system for automatic integration of data among a plurality of maintenance data, the plurality of maintenance data being diffused through a set of maintenance documentary elements comprising a set of directed links, the system including a processor configured for extracting a subset of pertinent links according to predetermined extraction rules and for integrating into a resultant element pertinent maintenance data sourced from a subset of pertinent maintenance documentary elements associated with the subset of pertinent links.

9 Claims, 2 Drawing Sheets

(56) References Cited

U.S. PATENT DOCUMENTS

| | | | | |
|---|---|---|---|---|
| 2005/0261889 A1* | 11/2005 | Iwakura | ................ | G06F 17/278 |
| | | | | 704/4 |
| 2006/0149770 A1* | 7/2006 | Jang | .................... | G06F 17/2229 |
| 2007/0083506 A1* | 4/2007 | Liddell | ............... | G06F 17/2785 |
| 2007/0112576 A1* | 5/2007 | Avery | ............. | G06Q 10/06393 |
| | | | | 705/7.39 |
| 2008/0005617 A1* | 1/2008 | Maggiore | .............. | G07C 5/006 |
| | | | | 714/30 |
| 2009/0138139 A1* | 5/2009 | Tsai | ....................... | G06Q 10/06 |
| | | | | 701/3 |
| 2010/0005049 A1* | 1/2010 | Kawai | ................... | G06F 17/278 |
| | | | | 706/47 |
| 2012/0005542 A1* | 1/2012 | Petersen | ............. | G06F 11/0709 |
| | | | | 714/48 |
| 2013/0166135 A1* | 6/2013 | Dunsdon | ................... | B64F 5/40 |
| | | | | 701/29.3 |
| 2014/0075294 A1* | 3/2014 | Hadley | ................. | G06F 17/212 |
| | | | | 715/243 |
| 2014/0229475 A1* | 8/2014 | Walsh | .................... | G06F 16/35 |
| | | | | 707/728 |
| 2015/0096018 A1* | 4/2015 | Mircescu | ................ | G06F 21/56 |
| | | | | 726/23 |
| 2016/0098448 A1* | 4/2016 | McShane | ............ | G06F 17/2705 |
| | | | | 707/713 |

OTHER PUBLICATIONS

French Search Report for Application No. 1459857 dated Jun. 19, 2015.

* cited by examiner

AUTOMATIC INTEGRATION OF DATA RELATING TO A MAINTENANCE OPERATION

CROSS-REFERENCE TO RELATED APPLICATION

This application claims priority to FR 14 59857 filed Oct. 14, 2014, the entire disclosure of which is incorporated by reference herein.

TECHNICAL FIELD

The present disclosure relates to the field of integration of data and more particularly concerns integration of maintenance data relating to one or more maintenance operations on an aircraft.

BACKGROUND

At present, to plan, prepare or carry out a maintenance action on an aircraft, a vehicle, a ship, a generator, an engine, etc., a maintenance operative must consult a large quantity of data in order to extract the maintenance data necessary for accomplishing the maintenance task.

In fact, the maintenance data is diffused through a plurality of documentary elements that may be contained in a plurality of sources of information. In the aeronautical field, the sources of information include for example a maintenance planning manual, an aircraft maintenance manual, a problem solving (troubleshooting) manual, a catalogue of spare parts, etc.

Moreover, each documentary element may include a correspondence with another documentary element in the same source of information or in another source. The documentary elements may therefore include directed links such that a first documentary element calls a second documentary element which in turn calls a third documentary element, and so on. The link structure may call a thousand documentary elements and some links may include tests or even loops. Moreover, not all the documentary elements called are necessarily pertinent and only some of these elements may be necessary for the maintenance operative to accomplish their task(s). Accordingly, in the context of the maintenance operation, some links may be useful but not others. The maintenance operative then selects for himself or herself the links deemed to be pertinent for the operational task of interest. All these operations of selection of pertinent links, extraction and grouping of pertinent information necessitate highly experienced maintenance operatives and a non-negligible time searching for information.

An object of the present disclosure is therefore to remedy the aforementioned drawbacks by proposing a method and a system for automatic integration of pertinent data relating to one or more maintenance operations, in particular on an aircraft, therefore making it possible to reduce maintenance time and costs.

SUMMARY

The disclosure herein aims to automate the integration of data for maintenance actions. The disclosure herein concerns a method and a system for automatic integration of data among a plurality of maintenance data, the plurality of maintenance data being diffused through a set of maintenance documentary elements comprising a set of directed links, the system including a processor configured for extracting a subset of pertinent links according to predetermined extraction rules and for integrating into a resultant element pertinent maintenance data sourced from a subset of pertinent documentary elements associated with the subset of pertinent links.

The system therefore features a mechanism that automatically integrates the pertinent data used for maintenance actions, in particular on an aircraft, thereby reducing maintenance time and costs.

The subject matter described in this specification may be implemented in hardware, software, firmware, or any combination thereof. In some examples, the subject matter described in this specification may be implemented using a non-transitory computer readable medium storing computer executable instructions that when executed by the processor of a computer cause the computer to perform steps.

Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform or may be distributed across multiple devices or computing platforms.

BRIEF DESCRIPTION OF THE DRAWINGS

Other features and advantages of the system and the method in accordance with the disclosure herein will emerge more clearly from a reading of the description given hereinafter by way of nonlimiting example and with reference to the appended drawings, in which.

DETAILED DESCRIPTION

A principle of the disclosure herein relates notably to automating the extraction of pertinent data relating to maintenance on an aircraft.

Figure 1:
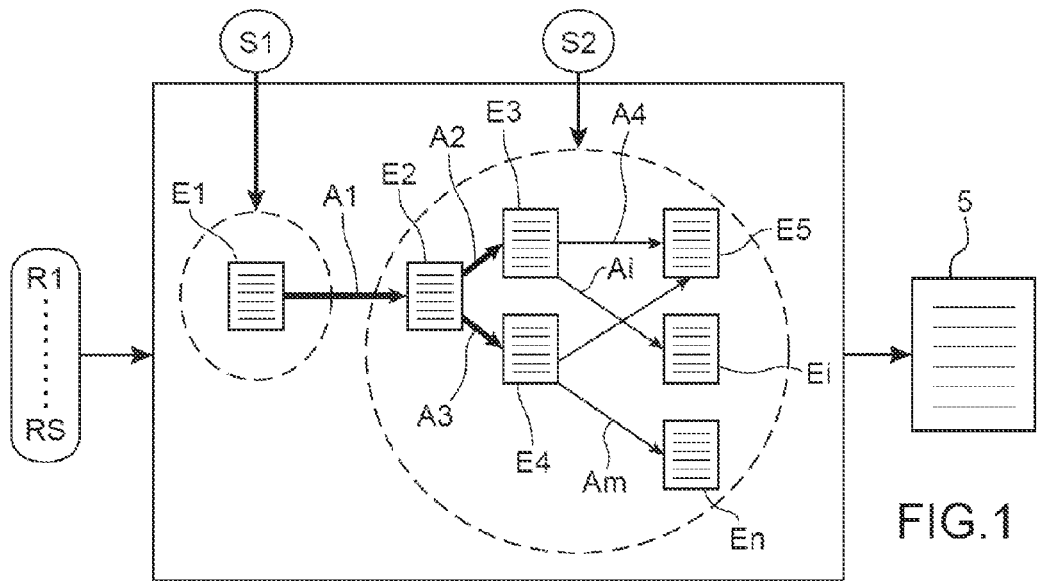
FIG. 1 show diagrammatically a system in accordance with one embodiment of the disclosure herein for automatic integration of maintenance data.

FIG. 1 shows diagrammatically a system 1 in accordance with one embodiment of the disclosure herein for automatic integration of maintenance data.

The maintenance data is diffused through a set of maintenance documentary elements E1-En that may be contained in a plurality of sources of maintenance information. It will be noted that a documentary element Ei may contain one or more documentary sub-elements. Moreover, the different documentary elements E1-En belonging to the same source of information or to different sources are interrelated by links or arcs A1-Am forming a kind of data graph in which each information node corresponds to a documentary element or a documentary sub-element and some pairs of nodes are connected by directed links. It will be noted that a node can point to a plurality of other nodes and that a link between nodes can be unidirectional or bidirectional.

For example, the maintenance documentary elements for an aircraft are sourced from at least one source of information S1, S2 among the following sources: a maintenance planning document MPD, an aircraft maintenance manual AMM, a problem solving (troubleshooting) manual, a wired connections manual, an illustrated catalogue of avionic systems, a catalogue of spare parts, technical follow-up (TFU) information, SIL (service information letter) complementary maintenance information, a navigatability set point, a service bulletin, etc. The sources of information may be contained in one or more databases.

The planning document MPD more particularly includes the different criteria governing the frequency of recurrence of the scheduled tasks for an aircraft type together with information on, for example, the intervals, the thresholds, the time and the workload, the number of operatives and their qualifications, the areas, access, etc. concerning each maintenance task. The MPD is essentially used to schedule a task but does not describe the task, the tools or the verifications tests.

On the other hand, the aircraft maintenance manual AMM describes all the maintenance procedures and includes the description of each task with, for example, the tools, the support equipment, the configurations and the tests necessary after accomplishing the task. Accordingly, in the AMM maintenance manual, each documentary element corresponds to a specific maintenance task (that may include one or more subtasks) that may call another task which in turn may call a further task, thereby forming a cascade of tasks. Each task, each subtask is defined by an identifier comprising a functional code indicating the category or function of the task or subtask.

In accordance with the disclosure herein the integration system 1 includes processor 3 (for example a processor or computer) configured to extract in accordance with predetermined extraction rules R1-Rs a sub-set of pertinent links A1-A3 (in bold) corresponding to the context of the maintenance actions or criteria of interest. The links of no utility are not selected and the optional links may be indicated for information purposes.

The extraction rules R1-Rs are determined by experts and may be expressed in the form of stop tables (or conditional tables). By "stop table" is meant a table containing reference numbers indicating the characteristics of a calling task and/or subtask and a called task as well as a conditional implication enabling taking into consideration or not taking into consideration a link between the calling task or subtask and the called task as a function of the characteristics or reference numbers of these different tasks. For example, a stop table may contain in first columns functional codes of the calling task and subtask and in a subsequent column the code of the called task and finally in the last column the behaviour relating to the selection of the link, which may be "obligatory", "optional" or "ignored". Variants can specify further call levels through additional columns.

The extraction rules R1-Rs may also be based on a study of the character strings included in the documentary elements E1-En. For example, if the calling task includes an implication connector to the called task of the form "if . . . then" or "only if", then the link between the two tasks is or is not taken into consideration according to certain conditions. For example, in the context of a schedule maintenance inspection, if a link is directed toward a called task requiring demounting of components in the event of damage (i.e. "if damage . . . then demounting of components"), this link will be considered optional by the extraction rule because demounting in the context of an inspection procedure is highly improbable.

Other extraction rules R1-Rs may be based on learning mechanisms analyzing the history of the use of the links. For example, consider a calling task XX, a calling subtask YY, and a called task ZZ. If more than 80% of users have selected the called task ZZ, then the links in accordance with this configuration will always be followed.

Further extraction rules R1-Rs may be based on an analysis of text and/or numeric codes and/or patterns contained in calling and called documentary elements. Moreover, different types of extraction rules R1-Rs may be combined.

Moreover, the extraction rules R1-Rs are advantageously ordered in a predetermined priority order so that a given rule can take priority over another rule.

Moreover, the processor 3 is configured to integrate automatically into a resultant element 5 pertinent maintenance data (or metadata) sourced from a subset of pertinent documentary elements E1-E4 (in bold) associated with the subset of pertinent links A1-A3 selected in accordance with the extension rules R1-Rs. In fact, once the links A1-A3 have been selected, the documentary elements and sub-elements E1-E4 associated with these links A1-A3 are known and the processor 3 therefore recovers and consolidates the pertinent maintenance data contained in these elements and subelements E1-E4.

More particularly, in accordance with a first embodiment, the pertinent maintenance data integrated into the resultant element 5 is formed from an aggregation of maintenance data associated with the subset of pertinent links E1-E4 and including appropriate instructions for accomplishing at least one maintenance task of interest.

In accordance with this first embodiment, the resultant element 5 therefore includes all the data and instructions necessary for accomplishing the required maintenance operation or operations in complete safety without wasting time searching for information.

In particular, in accordance with the first embodiment the resultant element 5 includes the maintenance configurations or the state of preparedness of the aircraft before the execution of the task (for example, depressurize a hydraulic circuit, interrupt an electrical circuit, lower flaps, etc.). The resultant element 5 also includes the tests to be effected after the execution of a task, the necessary tools, the support equipment, the consumables, the spare parts, the number of operatives and their qualifications, the duration of the task, access, the areas of intervention, etc.

Processor 3 is advantageously configured to supply also the links that have not been selected in the resultant element but that may correspond to potential or optional operations.

In accordance with a second embodiment, the pertinent maintenance data integrated into the resultant element 5 includes data designating a set of maintenance tasks fulfilling one or more criteria of interest. For example, the resultant element 5 may indicate all the tasks that impose extension of flaps and/or depressurization of a hydraulic circuit and/or opening a given door, etc.

Figure 2A:
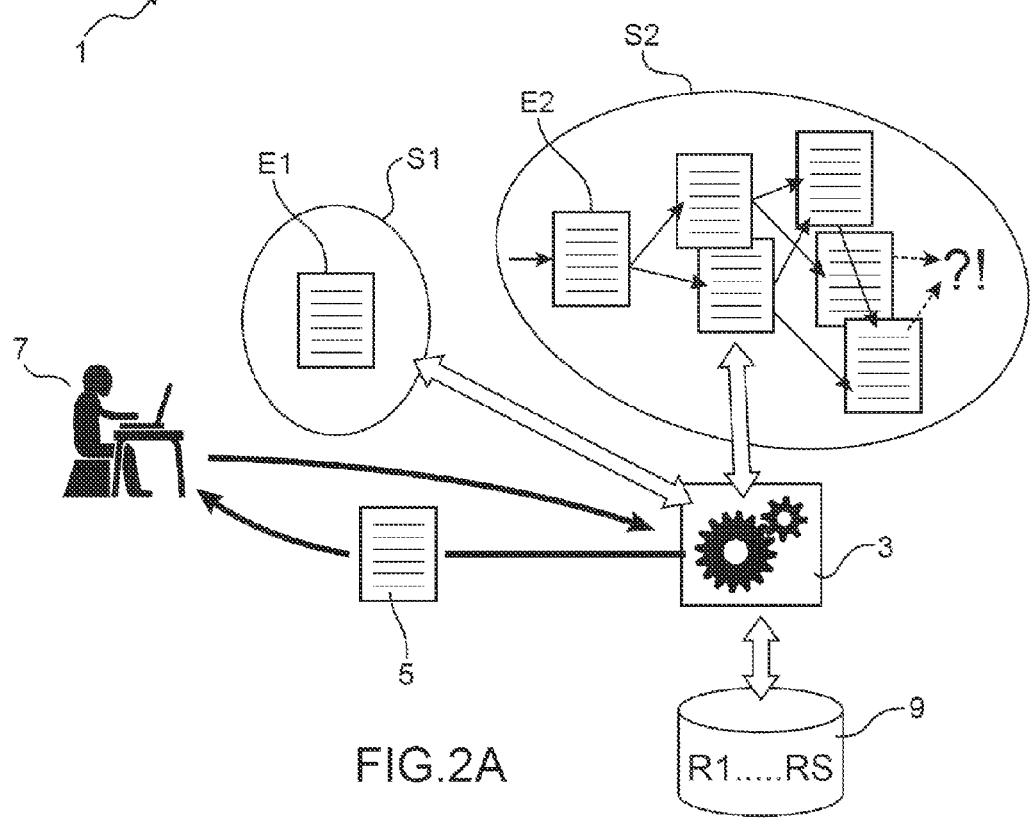
FIGS. 2A-2B show diagrammatically an example of how a method in accordance with one particular embodiment of the disclosure herein for automatic integration of aircraft maintenance data functions.

FIG. 2A shows diagrammatically an example of how a method in accordance with one particular embodiment of the disclosure herein for automatic integration of aircraft maintenance data functions.

Figure 2B:
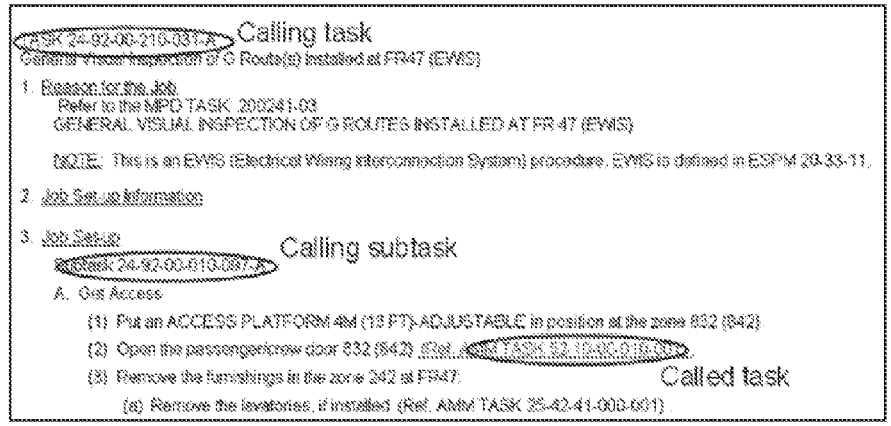

This example concerns planning a maintenance inspection on the basis of a maintenance manual AMM an extract from which is shown in FIG. 2B.

In fact, in a first step, a user or maintenance planner 7 submits a request for all the data necessary for carrying out a maintenance task of interest.

It will be noted that the maintenance tasks are structured in a precise manner. In fact, each task has an identifier formed of a series of multiple groups of digits and letters, each group having a specific meaning indicating, for example, the order of classification (start, middle, end) of the task in the unfolding of the procedure. The tasks may themselves be divided into subtasks and each subtask also has an identifier also formed of a series of multiple groups of specific digits and letters. The content of a task may include references to other tasks defined by their identifiers.

In accordance with this example, the task of interest concerns "a general visual inspection of an electrical connection system" identified in the planning document MPD under the reference "TASK: 200241-03".

In a second step, the processor 3 will consult the source S1 containing the planning document MPD to identify the task of interest TASK: 200241-03. The latter calls a principal task E2 in the maintenance manual AMM (contained in the source S2) under the reference "TASK: 24-92-00-210-031-A" corresponding to the general visual inspection. The principal task E2 includes data and instructions and may in turn call a cascade of secondary tasks or subtasks. In particular, the principal task E2 includes information concerning the objective of the task and indicates, for example, that this is "a general visual inspection of an electrical connection system" with reference to the planning document MPD TASK: 200241-03. In more concrete terms, the principal task E2 indicates that this is a procedure concerning an electrical wiring interconnection system (EWIS) that is defined in an electrical connection document ESPM 20-33-11 and also includes job set-up information.

The principal task E2 includes a subtask under the reference "Subtask 24-92-00-010-097-A" that gives information and instructions regarding access. In order to obtain access, this subtask requires the following actions: (1) put a platform in position in a given area of the aircraft; (2) open such a passenger and/or crew door and call another task with the reference "TASK 52-10-00-010-001"; (3) remove the cabin furnishings in a particular area and remove the lavatories if installed, and call another task with the reference "TASK 25-42-41-000-001".

Thus the scheduled task with the reference TASK: 200241-03 calls a principal or root task TASK: 24-92-00-210-031-A from the maintenance manual AMM. This root AMM task (calling other tasks) includes the (calling) subtask with the reference_Subtask 24-92-00-010-097-A, which calls a first called task with the reference TASK 52-10-00-010-001 and a second called task with the reference TASK 25-42-41-000-001. In the identifiers of the maintenance manual AMM in accordance with the ATA standard iSpec 2200, for example, the first three two-digit groups indicate the subdivision into systems. The next three-digit group is a functional code indicating the nature of the task or subtask. In accordance with this example, the root task includes the functional code "210" signifying a "general visual inspection", the calling subtask and the first called task include the same functional code "010" meaning "demount or open to obtain access" and finally the second called task includes a functional code "000" meaning "demount".

In a third step, the processor 3 consults a database 9 of extraction rules R1-Rs and uses these rules to extract only the links judged pertinent in relation to the maintenance task of interest. The links judged of no utility in accordance with the extraction rules are ignored and those which are considered optional are indicated as such.

With reference to the preceding example, a first extraction rule established by experts may be formulated in the following manner: "in all inspection tasks, in the job set-up part relating to access, if a task relating to an access opening is called, then it must be taken into account".

A second extraction rule established by experts may be expressed in the following manner: "in all inspection tasks, in the job set-up part relating to access, if a demounting task is called, then it must be taken into account". These two rules may be translated in accordance with a stop logic table in the following form:

| Calling task | Calling subtask | Called task | Link |
|---|---|---|---|
| 210 | 010 | 010 | Mandatory |
| 210 | 010 | 000 | Mandatory |

The first column indicates the functional code "210" of the calling task from the manual AMM (i.e. in all general visual inspection tasks), the second column indicates the functional code "010" of the calling subtask (i.e. in the job set-up part relating to the access openings), the third column indicates (in the first line) the functional code "010" of the first called task (i.e. a task relating to the access openings is called) and (in the second line) the functional code "000" of the second called task (i.e. a demounting task is called), the fourth column indicates the behavior with reference to links that here is "Mandatory" taking into account for the first and second called tasks. By executing the above rules, the processor 3 therefore constitutes an automated link extraction mechanism.

It will be noted that the last column of a stop table relating to the links may include the term "Optional" or "Ignored". The term "Optional" means that the link may be taken into account as a function of the preceding results and the processor 3 will therefore retain this link whilst skipping its content. The term "Ignored" means that the link must never be taken into account by the processor 3.

Alternatively, an extraction rule may be constructed on the basis of character strings contained in a task. In this case, the first rule of the preceding example could also be expressed in the following manner: if the title of the task includes the term "inspection" and if a section of the subtask includes the term "have access" and if the step of the subtask referring to a link includes a pattern of "open . . . door" type, then this link must always be taken into account.

Finally, the processor 3 forms a pertinent maintenance data resultant element 5 by aggregating the data contained in the tasks and subtasks associated with the pertinent links A1-A3 selected. For example, the resultant element 5 includes information and instructions on the tools, the area of the aircraft, the door that must be opened, etc. to accomplish the task of inspecting the wired interconnection in the specified area. The resultant element 5 is automatically displayed on a screen that may be consulted by the user 7 of the maintenance system. The user 7 therefore has direct, rapid and automatic access to the essential data for the scheduled task and is not swamped by a multitude of information and links of no utility.

Figure 3:
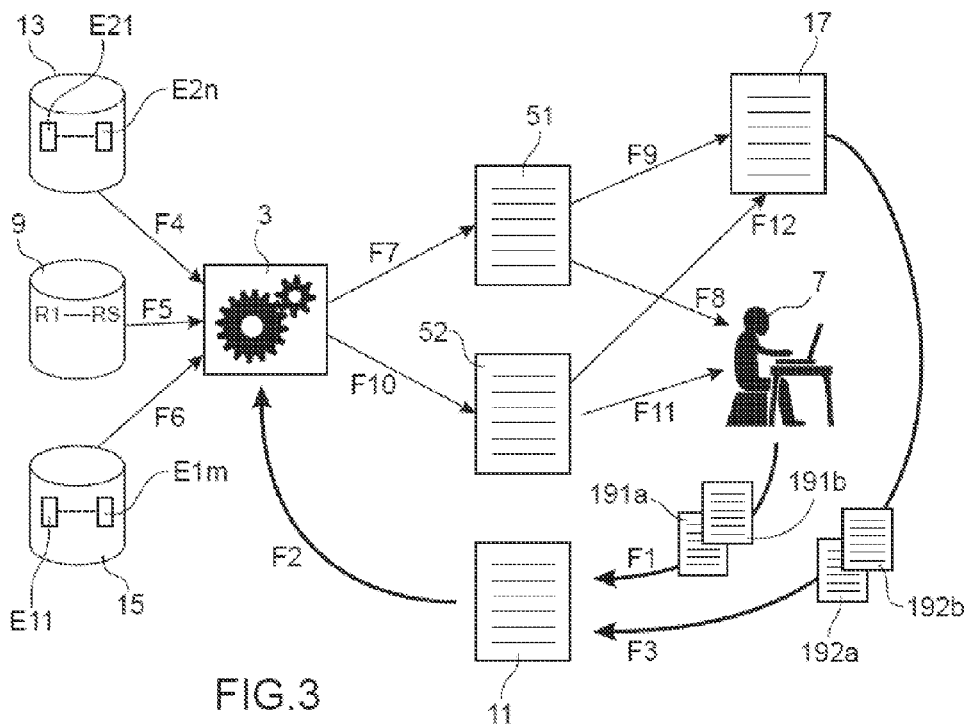
FIG. 3 shows diagrammatically the architecture of a system and a method in accordance with a preferred embodiment of the disclosure herein for automatic integration of maintenance data.

FIG. 3 shows diagrammatically the architecture of a system and a method in accordance with a preferred embodiment of the disclosure herein for automatic integration of maintenance data.

The integration system 1 includes processor 3, an interface 11, a database 9 of extraction rules R1-Rs, a database 13 of maintenance procedures, and a database 15 of complementary information.

The database 9 of extraction rules R1-Rs includes the rules defined by the experts and formulated in accordance with at least one form among the following forms: stop tables, character string, patterns, learning mechanisms, etc. These extraction rules R1-Rs are implemented as computer codes.

The maintenance procedure database 13 corresponds to a maintenance manual AMM and includes documentary elements E21-E2n on the maintenance tasks.

The complementary information database 15 includes documentary elements E11-E1m sourced from a maintenance planning document MPD and/or a problem solving (troubleshooting) manual and/or a wired connections manual and/or a catalogue of avionic systems and/or a catalogue of spare parts and/or technical information and/or navigatability set points and/or service bulletins, etc.

The different databases 9, 13, 15 may be located in a computer or a workstation. Alternatively, they may be accessed via communication network or via any combination of local bases and bases shared via a network.

The processor 3 can be implemented by a computer or server and is configured to extract the pertinent links automatically in accordance with the extraction rules R1-Rs and to integrate the pertinent data associated with these pertinent links.

The interface 11 is configured to enable interaction between the processor 3 and a computer application 17 or a user 7. The interface 11 therefore makes it possible to transmit a request 191a-192b to the processor 3 from the computer application 17 or the user 7 and to transmit to the computer application 17 or to the user 7 in return a resultant element 52, 51 processed by the processor 3 and addressing the request.

The arrows F1 and F2 refer to the transmission of a request 191a, 191b formulated by a user 7 to the processor 3 via the interface 11.

In accordance with a first example, the user 7 knows the maintenance task that must be carried out and a first request 191a then consists in or comprises knowing all the pertinent maintenance data necessary for accomplishing the task of interest and the resultant implications.

In accordance with a second example, a second request 191b may consist in or comprise knowing all the tasks that fulfil certain criteria of interest. For example, the user 7 would wish to benefit from the fact that a maintenance task should be carried out at a precise location on the aircraft and that this operation will necessitate the removal of an access panel, then the request 191b may consist in or comprise knowing all the tasks that impose the removal of this access panel. In order to minimize the time and cost of immobilization of the aircraft, the user 7 can therefore program the same maintenance date for all or some of these tasks, for example.

The arrows F3 and F2 show that the request 192a, 192b may be launched by a computer application 17 without human intervention. For example, the computer application 17 may be a maintenance management or planning application.

The arrows F4-F6 show that the processor 3 will interrogate the maintenance procedure database 13, the complementary information database 15 and the extraction rules database 9 to process the request launched by the user 7 or the application 17. The processor 3 applies the extraction rules to the graph of the documentary elements to determine if the called tasks should be taken into consideration. Once all of the pertinent links selected are known, the processor 3 integrates the pertinent data associated with this set of links into a resultant element 51, 52.

More particularly, in response to the first request 191a, 192a, the processor 3 determines (arrow F7) a first resultant element 51 comprising an aggregation of pertinent maintenance data suitable for accomplishing the maintenance task of interest. This result 51 is then transmitted to the user 7 (arrow F8) or to the application 17 (arrow F9).

Moreover, in response to the second request 191b, 192b, the processor 3 determines (arrow F10) a second resultant element 52 indicating the set of maintenance tasks fulfilling the criteria of interest. The result 52 is transmitted to the user 7 (arrow F11) or to the application 17 (arrow F12).

By a simple request, the method in accordance with the present disclosure therefore makes it possible to automate the extraction of pertinent data used for maintenance actions on an aircraft.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for automatic integration of data among a plurality of maintenance data relating to one or more maintenance operations on an aircraft, the plurality of maintenance data being diffused through a set of maintenance documentary elements comprising a set of directed links, the system comprising:
   a processor configured for:
      receiving a request for data necessary for carrying out a maintenance task;

identifying a maintenance task entry for the maintenance task in a maintenance procedure database corresponding to a maintenance manual for the aircraft;

extracting, from a plurality of pertinent links originating from the maintenance task entry for the maintenance task, a subset of the pertinent links according to predetermined extraction rules stored in a database of extraction rules, including identifying at least one link from a calling task to a calling subtask and excluding the at least one link from the subset of pertinent links based on an extraction rule from the database of extraction rules associated with the calling task and the calling subtask, wherein the database of extraction rules comprises a stop table including:

a first column of alphanumeric function codes of calling tasks;

a second column of alphanumeric function codes of called tasks; and a third column specifying extraction behaviors for links from calling tasks to called tasks, wherein excluding the at least one link comprises identifying a first alphanumeric function code for the calling task and a second alphanumeric function code for the called task in the stop table and determining, from the third column, an extraction behavior for the at least one link specifying exclusion from the subset of pertinent links; and integrating into a resultant element pertinent maintenance data sourced from a subset of pertinent documentary elements associated with the subset of pertinent links; and an interface configured to enable interaction between the processor and a computer application or a user, the interface transmitting the request to the processor from the computer application or the user and transmitting to the computer application or the user in response to the request the resultant element processed by the processor, thereby causing the resultant element to be displayed on a display screen.

2. The system according to claim 1, wherein the pertinent maintenance data integrated into the resultant element is aggregated maintenance data including appropriate instructions and/or information for accomplishing at least one maintenance task of interest.

3. The system according to claim 2, wherein the resultant element includes pertinent data among the following data: maintenance configurations, tests to be effected after execution of the task of interest, necessary tools, support equipment, consumables, spare parts, number of operatives and their qualifications, duration of the task, access, areas of intervention.

4. The system according to claim 1, wherein the pertinent maintenance data integrated into the resultant element includes data designating a set of maintenance tasks fulfilling criteria of interest.

5. The system according to claim 1, wherein the extraction rules are ordered in a predetermined priority order.

6. The system according to claim 1, wherein the extraction rules are established beforehand by learning and stored in a rules database.

7. The system according to claim 1, wherein the maintenance documentary elements are stored in at least one database and are sourced from at least one information source among the following sources: an aircraft maintenance manual AMM, a maintenance planning document MPD, a problem solving (troubleshooting) manual, a wired connection manual, a catalogue of avionic systems, a catalogue of spare parts, navigatability set points, and service bulletins.

8. A method of automatic integration of data among a plurality of maintenance data relating to one or more maintenance operations on an aircraft, the plurality of maintenance data being diffused through a set of maintenance documentary elements comprising a set of directed links, the method comprising:

receiving a request for data necessary for carrying out a maintenance task;

identifying a maintenance task entry for the maintenance task in a maintenance procedure database corresponding to a maintenance manual for the aircraft;

extracting, from a plurality of pertinent links originating from the maintenance task entry for the maintenance task, a subset of the pertinent links by a processor in accordance with predetermined extraction rules stored in a database of extraction rules, including identifying at least one link from a calling task to a calling subtask and excluding the at least one link from the subset of pertinent links based on an extraction rule from the database of extraction rules associated with the calling task and the calling subtask, wherein the database of extraction rules comprises a stop table including:

a first column of alphanumeric function codes of calling tasks;

a second column of alphanumeric function codes of called tasks; and a third column specifying extraction behaviors for links from calling tasks to called tasks, wherein excluding the at least one link comprises identifying a first alphanumeric function code for the calling task and a second alphanumeric function code for the called task in the stop table and determining, from the third column, an extraction behavior for the at least one link specifying exclusion from the subset of pertinent links;

integrating into a resultant element of pertinent maintenance data sourced from a subset of pertinent documentary elements associated with the subset of pertinent links; and interacting via an interface between the processor and a computer application or a user, the interface transmitting the request to the processor from the computer application or the user and transmitting to the computer application or the user in response to the request a resultant element processed by the processor, thereby causing the resultant element to be displayed on a display screen.

9. One or more non-transitory computer readable media storing instructions that, when executed by the one or more computers, cause the one or more computers to perform a method of automatic integration of data among a plurality of maintenance data relating to one or more maintenance operations on an aircraft, the plurality of maintenance data being diffused through a set of maintenance documentary elements comprising a set of directed links, the instructions comprising:

receiving a request for data necessary for carrying out a maintenance task;

identifying a maintenance task entry for the maintenance task in a maintenance procedure database corresponding to a maintenance manual for the aircraft;

extracting, from a plurality of pertinent links originating from the maintenance task entry for the maintenance task, a subset of the pertinent links by a processor in accordance with predetermined extraction rules stored in a database of extraction rules, including identifying at least one link from a calling task to a calling subtask and excluding the at least one link from the subset of pertinent links based on an extraction rule from the database of extraction rules associated with the calling task and the calling subtask, wherein the database of extraction rules comprises a stop table including:

a first column of alphanumeric function codes of calling tasks;

a second column of alphanumeric function codes of called tasks; and a third column specifying extraction behaviors for links from calling tasks to called tasks, wherein excluding the at least one link comprises identifying a first alphanumeric function code for the calling task and a second alphanumeric function code for the called task in the stop table and determining, from the third column, an extraction behavior for the at least one link specifying exclusion from the subset of pertinent links;

integrating into a resultant element of pertinent maintenance data sourced from a subset of pertinent documentary elements associated with the subset of pertinent links; and interacting via an interface between the processor and a computer application or a user, the interface transmitting request to the processor from the computer application or the user and transmitting to the computer application or the user in response to the request a resultant element processed by the processor, thereby causing the resultant element to be displayed on a display screen.

* * * * *